United States Patent [19]
Lawrence

[11] 3,849,596
[45] Nov. 19, 1974

[54] METHOD FOR COMPARISON USING SIMULTANEOUS DISPLAYS ON A VISUAL MONITOR

[76] Inventor: Lu Lawrence, 1024 N. Lincoln, Fullerton, Calif.

[22] Filed: Aug. 9, 1971

[21] Appl. No.: 170,202

[52] U.S. Cl. ........ 178/6.8, 178/DIG. 1, 178/DIG. 35
[51] Int. Cl. .......................................... H04n 7/18
[58] Field of Search 178/DIG. 33, DIG. 36, DIG. 37, 178/ DIG. 38, DIG. 1, 6.8; 340/324 AD, 149 R; 356/71

[56] References Cited
UNITED STATES PATENTS

| | | | |
|---|---|---|---|
| 2,648,723 | 8/1953 | Goldsmith | 340/149 R |
| 3,049,588 | 8/1962 | Barnett | 178/DIG. 33 |
| 3,321,575 | 5/1967 | Lewczyk | 178/DIG. 36 |
| 3,406,387 | 10/1968 | Werme | 340/324 AD |
| 3,585,440 | 6/1971 | Lee et al. | 178/6.8 |
| 3,598,907 | 8/1971 | Drinkuth et al. | 178/DIG. 33 |

Primary Examiner—Howard W. Britton
Attorney, Agent, or Firm—Raymond L. Madsen

[57] ABSTRACT

Progressive changes in a given subject undergoing processes of modification and alteration are illustrated by simultaneously displaying a plurality of video signals on a video monitor for visual comparison. At least one video signal containing information for creating at least one reference display of the given subject is recorded. The video monitor is activated to display the reference display. At least another video signal is generated containing information for creating at least one comparison display of the given subject, the comparison display presenting the given subject at times different from the reference display. The video monitor is activated to display the at least one comparison display whereby the reference and comparison displays are produced simultaneously on the video monitor for visual comparison.

4 Claims, 2 Drawing Figures

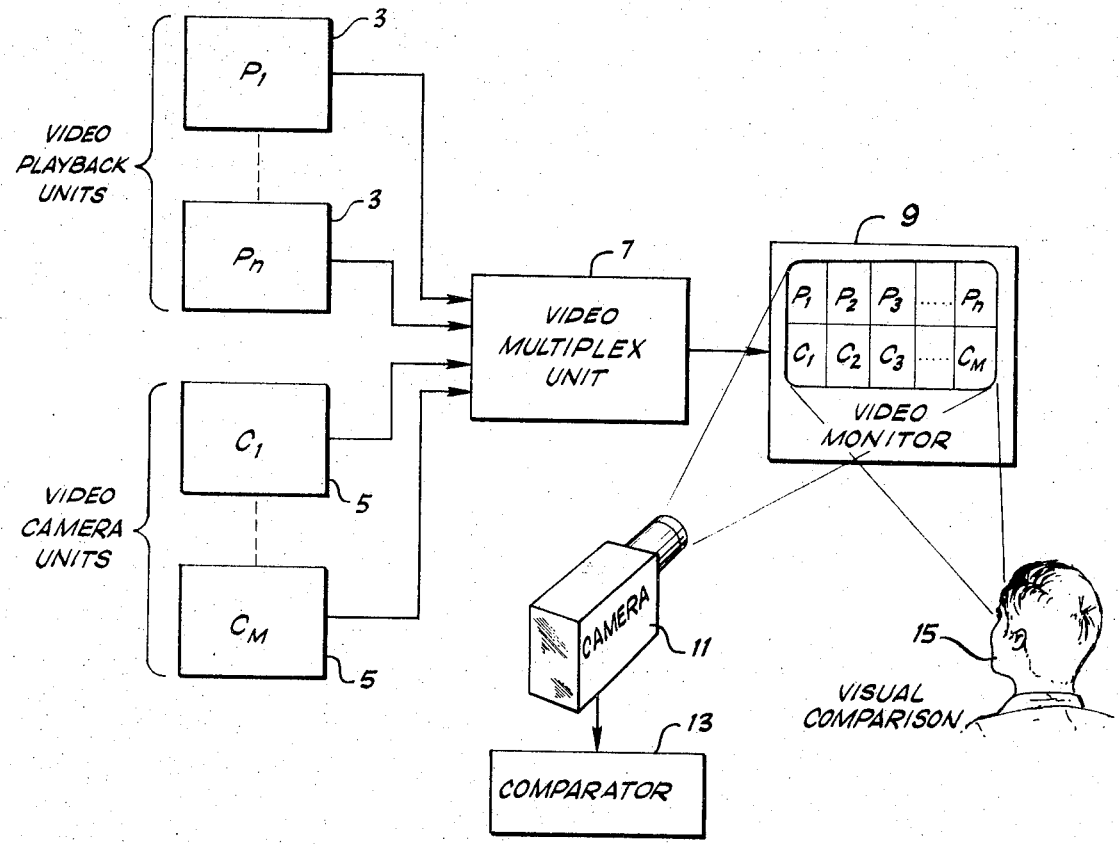

METHOD FOR COMPARISON USING SIMULTANEOUS DISPLAYS ON A VISUAL MONITOR

The present invention relates to the field of comparative analysis and more particularly to a method of showing likenesses and differences by simultaneous visual comparison of a plurality of displays produced on a video monitor.

In the field of teaching it has been the general practice to employ teachers to perform the process of detecting and analyzing the learning progress and educational advancement of a student enrolled in a program of instruction. In addition, it has been customary for the teacher to demonstrate to the student the correct methods, techniques, or processes relevant to the program of educational instruction. Although such methods have served the purpose, they have not proved entirely satisfactory under all conditions of teaching for the reasons that considerable difficulty has been experienced in teachers detecting and analyzing deficiencies in a given student's performance thereby enabling the student to perfect his performance and difficulties encountered in helping the student to understand and cope with his instructional progress and performance deficiencies.

Those concerned with the development of effective teaching techniques have long recognized the need for a teaching method which not only enables the teacher to detect and analyze any problems in a student's progress but also for the student to observe and understand his own instructional achievement and progress. The present invention fulfills this need. Although movie film offers a way of recording the various steps of achievement in student-teacher instructional relationships, it has not offered a way of simultaneous comparison whereby the teacher and student can visually compare past and present performance on a common viewing screen.

In the field of military operations, it has been the general practice to train military personnel to identify various military weapons, missiles, vehicles and aircraft by visual recognition through memorized physical characteristics. The process of memorization has generally been accomplished through repeated visual contact and study with charts, models, pictures and photographs. Although these memorization methods have served the purpose, they have not proved satisfactory under all conditions for the reason that the subject matter is viewed in a fixed stationary position and not in its natural surroundings. The present invention overcomes these difficulties by providing video displays of the subject in motion and in actual surroundings and environmental conditions simultaneously with video displays of other, similar and dissimilar subjects to which its likenesses and differences are compared.

Those concerned with the evaluation of the destructive effects of munitions have long recognized the need for effective "before" and "after" methods of comparison to determine the magnitude and pattern of the explosive forces. The present invention provides simultaneous video displays of geographic areas and particular objects and objects and targets before and after being subjected to the effects of a munition.

In the field of advertising it has long been recognized by those concerned with evaluation of a particular service or product that a need exists for presenting "before" and "after" simultaneous visual displays of subjects to which the service or product is directed as a method for evaluating and demonstrating the effectiveness of the service or product and thereby promote its sale and marketability.

In the field of medicine it has been the general practice to teach and train medical personnel through their observation of accepted methods and techniques and then through their copying or imitating what they have seen and learned. Although this method has served the purpose, it has not proved satisfactory in all conditions in that the student cannot see himself as others do and therefore cannot compare his methods and techniques with those which he has observed and is attempting to duplicate. The present invention overcomes this difficulty by providing simultaneous video displays of the teacher performing the accepted method or technique and the student attempting to copy the same, whereby direct comparison of teacher and student may be accomplished as well as comparison of the student with himself before and after various stages of instruction and practice. In addition, the present invention enables the medical patient to be observed before and after medical treatment to evaluate his response to medical treatment and recovery as well as the effectiveness of the treatment or therapeutic procedure.

It has long been recognized in the field of sports, the need for teacher-student comparison by the student and comparison of the student with himself at different times so that he may recognize the strengths and weaknesses of his playing ability to enable faster and more effective improvement. The present invention satisfies this need.

The field of fine arts involves the developing of artistic talent through hours of long practice and imitation of techniques which have proved successful for the masters. Although this method has been utilized successfully, it has not proved satisfactory in all circumstances in that the fine art student cannot see his own performance or technique side by side with that of a master or side by side with displays of his performance and technique recorded at various other times of interest in his artistic development. The present invention overcomes this difficulty. In addition the present invention provides for the viewing of works of art such as paintings and sculptures and other inanimate objects at various times and stages during their creation for further demonstrating and illustrating important and critical steps in the rendering of an artistic work.

Quality control in the field of manufacture generally has involved the comparison of produced products and inanimate objects with standard products or specifications. Where size, shape, color and the physical factors are controlled, it has been necessary for inspection personnel to physically compare the actual product with the physical standard. While these comparative techniques have been utilized successfully, they have not proved satisfactory in all cases in that the viewing environment is not controlled and the inspector views the products using his own methods and techniques to arrive at a comparative conclusion. The present invention overcomes this difficulty by providing a consistent repeatable video monitor comparative displays recorded at different times and at different steps in a process which, if necessary, may be superimposed, one display upon another, for precise quality control.

In addition to the fields set forth above, the present invention overcomes the problems and difficulties of instruction and analytical evaluation in any field in which a subject or object is subjected to a process of certain influencing and altering changes and environmental effects by providing a plurality of visual displays by which the subjects or objects can be compared at various stages and different points in time during the process.

The general purpose of this invention is to provide a method of comparative analysis which embraces all the above advantages of similarly employed methods and possesses none of the aforedescribed disadvantages. To attain this, the present invention contemplates a unique method embodying the simultaneous display of video information on a common viewing screen whereby the likenesses and differences in reference and comparison displays may be compared.

An object of the present invention is the provision of a method of simultaneously comparing a given subject before and after at least one of a series of environmental alterations and changes.

Another object is to provide a teaching method whereby the learning progress of a student may be detected, analyzed and measured by simultaneous comparison of the student's performance before and after being subjected to teaching instuction.

A further object of the invention is a method for comparing the effects of influencing factors upon a given subject by simultaneously viewing the given subject before and after being subjected to the particular influencing factors.

Still another object is to provide a teaching method by which the effectiveness of various steps in a program of educational instruction can be illustrated and compared.

An object of the present invention is the provision of a method of simultaneously comparing a given subject before and after at least one of a series of environmental alterations and changes.

Another object is to provide a teaching method whereby the learning progress of a student may be detected, analyzed and measured by simultaneous comparison of the student's performance before and after being subjected to teaching instruction.

A further object of the invention is a method for comparing the effects of influencing factors upon a given subject by simultaneously viewing the given subject before and after being subjected to the particular influencing factors.

Still another object is to provide a teaching method by which the effectiveness of various steps in a program of educational instruction can be illustrated and compared.

Yet another object of the present invention is the provision of a method of comparative analysis using simultaneous video monitoring displays on a common monitor whereby the effect of altering operations and changes on a given subject can be detected and evaluated.

Other objects and many of the attendant advantages of this invention will be readily appreciated as the same becomes better understood by reference to the following detailed description when considered in connection with the accompanying drawings wherein:

FIG. 1 illustrates a block and pictorial diagram of an equipment configuration which can be utilized in connection with a method of comparative analysis embodying the steps of the present invention; and FIG. 2 illustrates the steps of the comparative method of the present invention.

Referring now to the drawings, FIG. 1 illustrates a combination of equipment which may be used in connection with a preferred embodiment of the present invention. Pre-recorded video information which may be impressed upon video tapes, magnetic discs, and other recording medium of a similar nature are inserted into or operated in connection with a plurality of video playback units 3 designated as $P_1$-$P_n$ in FIG. 1. Video playback units 3 are in turn connected to video multiplex unit 7.

A plurality of video camera units 5 designated as $C_1$-$C_n$ in FIG. 1, are also connected to video multiplex unit 7. Video multiplex unit 7 in turn selectively connects each of the video playback units 3 and video camera units 5 to video monitor 9 in a manner to display upon the screen of video monitor 9 video pictures or pictorial scenes generated from each of the video playback units and video camera units. This display is viewed by camera unit 11 which in turn is connected to comparator 13 wherein one pictorial scene is compared with another. Comparator 13 may be an optical comparator or a computer whereby certain characteristics of one portion of the display of video monitor 9 can be compared with those of another portion of the display.

FIG. 2 sets forth the steps of the preferred embodiment of the method of comparison of the present invention. The first step comprises recording reference video information of a given subject. The second step includes activating a video monitor for displaying the reference video information. Step three involves generating comparison information of the given subject. Step four comprises activating the video monitor for simultaneously displaying the comparison information with the reference information. And finally, step five includes comparing the reference and comparison displays.

The application of the method can best be described by turning to FIG. 1. The video playback units 3 consist of apparatus such as playback unit manufactured by Sony, Model CV 3600, or its equivalent. The video camera units 5 may be units such as Sony VCK200. Video multiplex units 7 may be a Special Effects Generator Model No. 34 manufactured by Gordon Enterprises. The Special Effects Generator produces a composite output signal of all the input video signals arranged in a predetermined synchronized time sequence which may be connected to a video monitor of the type well known in the television industry for display. Camera 11 can be an optical comparator wherein the display of the video monitor 9 may be optically compared with a pre-selected display by which differences in the video monitor display from the comparison display in the camera can be detected. An alternative is to have camera 11 produce an electrical signal which is directed into comparator 13 which may be an electronic computer or computing apparatus such as used as in aerospace and military applications for identification of objects and enhancement of visual information or apparatus for comparing video signals as set forth in U.S. Pat. No. 3,049,588 issued to J. S. Barnett entitled "Quality Control Systems." whereby the display on video monitor 9 is analyzed for variations from a pre-selected standard. It should be clear that the electrical signal from video multiplex unit 7 may be directly applied or connected to comparator 13 thereby bypassing and eliminating video monitor 9 and camera 11. Video monitor 9 may be of the type manufactured by Sony, Model CVM2300. It should also be clear that the output of video multiplex unit 7 may be recorded on video tape and then played back at a later time on a video playback unit directly into comparator 13.

Video information of a given subject is prerecorded in video tape, utilizing a video camera and video tape recorder apparatus well known in the art of television such as that described above. The video tapes with the reference video information recorded thereon are placed in video playback units 3 to provide a video information signal to video multiplex units 7. Video camera units 5 are directed to view a given subject or group of different subjects to generate comparison video information signals which are directed to the output of video multiplex unit 7. Video multiplex unit 7 is a composite of the video input signals combined in a predetermined synchronized time sequence to produce a single video output signal which activates the video monitor 9 in a manner to simultaneously display on the screen of video monitor 9 a plurality of pictorial views in either overlapping or adjacent configuration relative to one another, which views each represent a video information signal from one of the video playback or video camera units.

The method of comparative analysis first involves recording reference video information on a given subject or group of subjects which are subsequently subjected to various altering influences or environmental changes such as a program of teaching instruction. The video monitor is then activated through a video playback unit and a video multiplex unit to produce a plurality of pictorial scenes on the screen of the video monitor in response to the reference video information. The plurality of camera units generate comparison video information by viewing the subject or group of subjects subsequent to the altering influences or environmental changes for comparison with the reference video information. The video monitor is activated by the video multiplex unit and the video camera units to produce a multiplicity of pictorial scenes on the screen of the video monitor which can be directly compared with previously produced reference pictorial scenes. The last step involves comparing the reference and comparison pictorial scenes for the purposes of determining the effects of the environmental alterations or conditions such as the effects of a teaching or educational instructional program.

The teaching method has great application and use in, but not limited to, the fields of hair styling, cosmetics, dermatology, figure control, fashion designing, home improvements, food processing, animal husbandry, sports, fine arts, personal fitness, landscaping, medicine, dentistry, law, engineering, geology, biology, ecology, manufacturing processes, and other fields in which a comparative analysis may be utilized. The present invention sets forth a method by which given subjects such as human beings, animals, art objects, structures and manufactured objects may be subjected to altering and changing influences and can be compared at various stages or before and after the changing influence has been experienced. As a result, the effects of the influences can be studied and analyzed to determine their effectiveness and value and improve or enhance their result and utility.

Obviously many modifications and variations of the present invention are possible in the light of the above teaching including the overlapping and superimposition of displays. It is therefore to be understood, that within the scope of the appended claims, the invention may be practiced otherwise than is specifically described.

It now should be apparent that the present invention provides a method of comparative analysis which may be employed in conjunction with a process, product and program of instruction for improving the effectiveness of the process, the product, the teacher, teaching materials and the student learning process by simultaneously displaying before and after pictorial views of given subject matter and other objects which may be subjected to the process, program or other influencing and altering factors.

Although particular steps have been discussed in connection with a specific method of comparative analysis as applied to video apparatus in accordance with the teachings of the present invention, others may be utilized. Furthermore, it will be understood that although an exemplary embodyment of the present invention has been disclosed and discussed, other applications and arrangements are possible and that the embodyments disclosed may be subjected to various changes, modifications and substitutions without necessarily departing from the spirit of the invention.

What is claimed is:

1. A method for comparative analysis wherein a plurality of pictorial scenes are simultaneously displayed on the screen of a video monitor for comparison, comprising the steps of:

recording at least one video signal containing information for creating at least one reference pictorial scene of a given subject;

activating the video monitor screen for separately displaying said at least one reference pictorial scene;

generating video information for creating at least one comparison pictorial scrcene of said given subject, said at least one comparison pictorial scene presenting said given subject at times different from said at least one reference pictorial scene; and activating the video monitor screen for separately displaying said at least one comparison pictorial scene whereby said reference and comparison pictorial scenes are produced separately and simultaneously on the video monitor screen for comparison of said given subject.

2. The method described in claim 1 wherein said step of activating the video monitor screen for displaying said at least one reference display includes the steps of:

connecting the recorded video signal of said at least one reference pictorial scene of a given subject to a video multiplex unit, said unit having a multiplicity of inputs for video signals and having one composite video output signal whereby the input video signals including said recorded video signal are combined in a predetermined synchronized time sequence to produce said one composite video output signal; and connecting said one composite video output signal for said video multiplex unit to said video monitor whereby said video monitor is activated for displaying said at least one reference pictorial scene.

3. The method described in claim 2 wherein said step of activating the video monitor screen for displaying said at least one comparison pictorial scene includes the steps of connecting the generated video information of said at least one comparison pictorial scene of said given subject to one of said multiplicity of inputs whereby the comparison video information is combined in a predetermined synchronized time sequence with said recorded video signal of said at least one reference pictorial scene to form said video multiplex unit composite output signal to activate said video monitor for displaying said at least one comparison pictorial scene along with said at least one reference pictorial scene.

4. A method for illustrating progressive changes in a given subject upon which a process of alteration and modification is applied wherein a video special effects generator combines first and second pictorial scenes of the subject generated before and after the process, respectively, for simultaneous display on a video monitor comprising the steps of:

recording the first pictorial scene of the given subject before the application of the process;

generating the second pictorial scene of the given subject after the application of the process;

combining said first and second pictorial scenes sequentially in time in the video special effects generator for simultaneous adjacent pictorial display on the video monitor of the given subject before and after the process; and comparing the simultaneous pictorial displays for visually illustrating the changes in a given subject.

* * * * *